US010758914B2

(12) United States Patent
Schmidt

(10) Patent No.: US 10,758,914 B2
(45) Date of Patent: Sep. 1, 2020

(54) DEVICE FOR PRODUCING A GRANULATE

(71) Applicant: ALEXANDERWERK GMBH, Remscheid (DE)

(72) Inventor: Alexander Schmidt, Marienmunster (DE)

(73) Assignee: Alexanderwerk GmbH (DE)

( * ) Notice: Subject to any disclaimer, the term of this patent is extended or adjusted under 35 U.S.C. 154(b) by 430 days.

(21) Appl. No.: 15/556,923

(22) PCT Filed: Mar. 3, 2016

(86) PCT No.: PCT/EP2016/054488
§ 371 (c)(1),
(2) Date: Sep. 8, 2017

(87) PCT Pub. No.: WO2016/142251
PCT Pub. Date: Sep. 15, 2016

(65) Prior Publication Data
US 2018/0243748 A1    Aug. 30, 2018

(30) Foreign Application Priority Data

Mar. 10, 2015 (DE) .................. 10 2015 204 289
Mar. 27, 2015 (DE) .................. 10 2015 205 642

(51) Int. Cl.
*B02C 18/00* (2006.01)
*B02C 18/14* (2006.01)
(Continued)

(52) U.S. Cl.
CPC .............. *B02C 18/144* (2013.01); *B01J 2/14* (2013.01); *B01J 2/20* (2013.01); *B02C 25/00* (2013.01); *B02C 2023/165* (2013.01)

(58) Field of Classification Search
CPC ..... B02C 25/00; B02C 13/095; B02C 13/284; B02C 13/13; B02C 23/10; B02C 23/00;
(Continued)

(56) References Cited

U.S. PATENT DOCUMENTS 2,045,687 A * 6/1936 Armstrong ................ B02C 4/26
241/87.1
3,419,223 A * 12/1968 Morin .................... B02C 18/144
241/73
(Continued)

FOREIGN PATENT DOCUMENTS

EP         0291216 A1    11/1988
JP       2000001223 A     1/2000
(Continued)

OTHER PUBLICATIONS

International Search Report and Written Opinion of PCT/EP2016/054488, dated May 13, 2016, 8 pages.
(Continued)

*Primary Examiner* — Faye Francis
(74) *Attorney, Agent, or Firm* — Barnes & Thornburg LLP

(57) ABSTRACT

A device for granulating coarse material is disclosed herein. Examples of course material include pulverulent solids such as powder, grain, or mixtures thereof. The device includes a rotor, a screen, and an automatic distance adjusting unit. The rotor is configured to rotate/oscillate and press the coarse material through the screen in order to produce a granulate with a smaller granulate unit size compared to the coarse material. The automatic distance adjusting unit is configured to adjust a distance between the rotor and the screen.

11 Claims, 1 Drawing Sheet

(51) Int. Cl.
*B01J 2/14* (2006.01)
*B01J 2/20* (2006.01)
*B02C 25/00* (2006.01)
*B02C 23/16* (2006.01)

(58) Field of Classification Search
CPC ....... B02C 23/08; B02C 23/16; B02C 18/062; B02C 18/26; B01J 2/20; B01J 2/14
USPC .................................................. 241/73, 286
See application file for complete search history.

(56) References Cited

U.S. PATENT DOCUMENTS

| | | | | |
|---|---|---|---|---|
| 4,557,421 | A * | 12/1985 | Probst | B02C 13/284 |
| | | | | 241/285.3 |
| 6,641,065 | B2 * | 11/2003 | Bardos | B02C 13/095 |
| | | | | 241/186.35 |
| 6,910,647 | B2 * | 6/2005 | Alford | B02C 13/284 |
| | | | | 241/285.2 |
| 7,222,805 | B1 * | 5/2007 | Williams, Jr. | B02C 13/284 |
| | | | | 241/32 |
| 7,240,871 | B2 * | 7/2007 | Sotomayor | B02C 13/284 |
| | | | | 241/285.1 |
| 8,844,849 | B2 * | 9/2014 | Schiffer | B02C 13/284 |
| | | | | 241/242 |
| 9,254,492 | B2 * | 2/2016 | Gardner | B07B 1/185 |
| 9,289,776 | B2 * | 3/2016 | Virdis | B02C 4/26 |
| 9,573,137 | B2 * | 2/2017 | Van der Galien | B02C 4/34 |
| 9,592,513 | B2 * | 3/2017 | Hamalainen | B02C 13/09 |
| 9,776,192 | B2 * | 10/2017 | Ebadian | B02C 18/18 |
| 2004/0251346 | A1 * | 12/2004 | Verhoef | B02C 13/09 |
| | | | | 241/73 |
| 2004/0256507 | A1 * | 12/2004 | Poeltinger | B02C 18/14 |
| | | | | 241/242 |
| 2006/0027690 | A1 * | 2/2006 | Verhoef | B02C 13/09 |
| | | | | 241/73 |
| 2011/0259985 | A1 * | 10/2011 | Schiffer | B02C 13/284 |
| | | | | 241/277 |
| 2013/0119172 | A1 * | 5/2013 | Virdis | B02C 4/26 |
| | | | | 241/27 |
| 2013/0161427 | A1 * | 6/2013 | Hongo | B02C 13/06 |
| | | | | 241/73 |
| 2013/0240652 | A1 * | 9/2013 | Gardner | B07B 1/185 |
| | | | | 241/89.1 |
| 2016/0271620 | A1 * | 9/2016 | Ebadian | B02C 18/18 |
| 2017/0143027 | A1 * | 5/2017 | Lieser | B02C 23/16 |

FOREIGN PATENT DOCUMENTS

| | | |
|---|---|---|
| JP | 2010159122 A | 7/2010 |
| WO | 2012003877 A1 | 1/2012 |

OTHER PUBLICATIONS

International Search Report and Written Opinion of PCT/EP2016/054488, dated Sep. 12, 2017, 7 pages.

English translation of International Search Report and Written Opinion of PCT/EP2016/054488, dated Sep. 12, 2017, 7 pages.

* cited by examiner

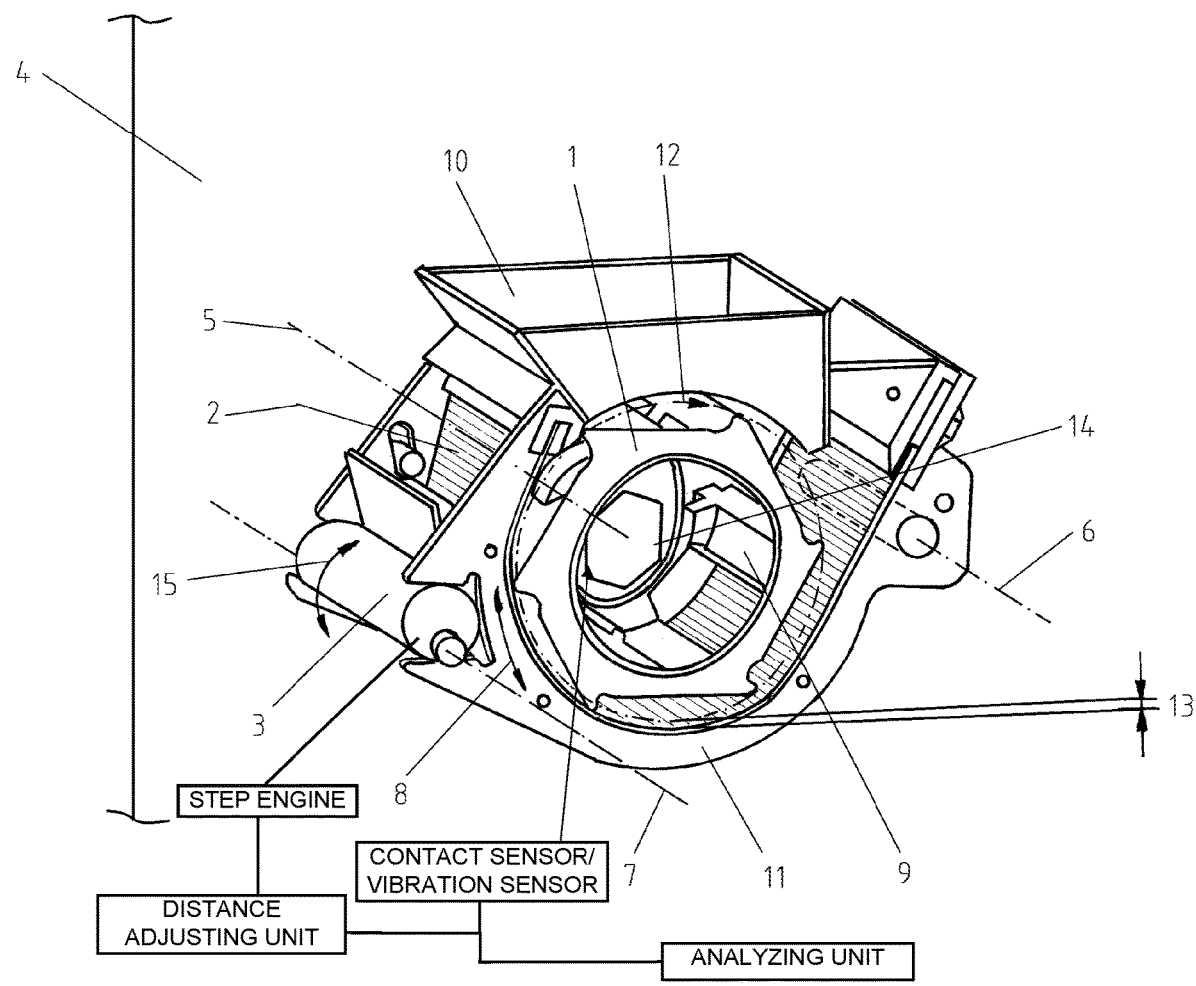

DEVICE FOR PRODUCING A GRANULATE

CROSS-REFERENCE TO RELATED APPLICATIONS

This application is a national stage entry under 35 USC § 371 of PCT International Application No. PCT/EP2016/054488, filed Mar. 3, 2016, and claims the benefit under 35 USC § 119(e) to German Application No. 102015204289.8, filed 10 Mar. 2015 and to German Application No. 102015205642.2 filed 27 Mar. 2015.

FIELD OF THE DISCLOSURE

The present disclosure concerns a device for granulating coarse material.

BACKGROUND

In the chemical, pharmaceutical and basic industry, pulverulent solids such as powder, grain or mixtures thereof are as raw materials further processed into smaller units, e.g. pellets (pills, tablets). Problems during said further processing may be caused in particular by the high air content or a lack of pourability. Therefore, the pulverulent raw material is commonly at first compacted and granulated prior to a further processing. For that purpose, the raw material is usually by means of an auger feed precisely dosed and steadily fed to the press rolls of a roller press. Though the pressing of the pulverulent raw material between two press rollers, a homogenous, rigid, high dense and usually strip shaped coarse material, also called "flakes" (German "Schülpe"), is obtained as intermediate product. The flakes, produced by the compacting, are granulated to the desired spectrum of grains by means of a single or multiple stage granulator, which presses the flakes though a screen by a rotor. A well pourable granulate can thus be obtained with very low air content and predefined grain size, which can usually be further processed or pressed, respectively into smaller units, like pellets, also without the use of chemical additives such as binder. Such a granulator can be provided as a separate machine or be combined together with a compacting apparatus in a single machine.

Adjusting a distance between rotor and screen commonly occurs manually. Therefore, the production effectiveness and granulate quality usually underlie fluctuations.

SUMMARY

It is one object of the present disclosure is to provide a further developed device for granulating.

Accordingly, the present disclosure describes a device for granulating coarse material. Exemplary course materials may comprise pulverulent solids such as powder, grain, or mixtures thereof and which can be created by pressing or compacting by means of press rolling of the pulverulent solid. The device for granulating comprises a rotatable and/or oscillating rotor and a screen. The rotor is composed such that the rotor can convey or press the coarse material through the screen in order to produce a granulate with a smaller granulate unit size compared to the coarse material. The device for granulating comprises an automatic distance adjusting unit for adjusting a distance between the rotor and the screen. The automatic distance adjusting unit is composed such that the distance between the rotor and the screen is (or can be) reduced until there is a direct contact of the rotor with the screen, and subsequent to that, the distance is increased or can be increased to a predetermined target distance.

In the following, an embodiment example of a device for granulating is schematically illustrated in the FIGURE and with reference to the drawing the embodiments as well as additional advantageous embodiments are described in further detail.

BRIEF DESCRIPTION OF THE DRAWING

FIG. 1: Detailed view of the rotor-screen-area of a device for granulating

DETAILED DESCRIPTION

FIG. 1 shows a partial view of a device for granulating, wherein a cover plate is hidden that otherwise would cover the rotor 1 and the screen 2.

The shown device for granulating is a combination machine, which allows compacting and granulating, wherein the pulverulent or fine grained raw material is firstly preprocessed by two pressure rolls into a homogeneous, rigid, high dense, strip shaped coarse material or flakes and subsequently supplied via a funnel 10 to the rotor 1, which presses the flakes through the screen 2 provided in form of a supported sieve fabric or perforated special plate (metal sheet) to obtain a granulate with the desired granulate unit size. In particular, the device is a two-stage granulator with two rotor-screen-assemblies being arrange vertically over one another.

In particular, the rotor 1 is designed as rotating cage having two spaced rotor rings coaxially arranged with respect to rotor rotation axis 5, which preferably have a multi-sided outer contour, in particular hexagonal outer contour. The two rotor rings are connected to each other through rotor bars 9, whereby a cage like structure of the rotor 1 is formed. In particular, the rotor bars 9 are arranged under an acute angle relatively to the tangent. Coarse material can get to the rotor 1 via the funnel 10, which is arranged above the rotor 1. Due to the high rotational speed of the rotor 1, the onto the rotor 1 falling, coarse material is conveyed or redirected in rotation direction 12 by the rotor bars 9 and dashed against the screen 2. As the material supply is faster than the material flow through the screen 2, a layer of coarse material forms on the screen 2.

As soon as this layer reaches the thickness of the distance 13 between rotor 1 an screen 2, the coarse material is pressed by the rotor 1 or rotor bars 9 though the screen 2 or the screen insert with screen openings. By this way, by means of the rotor bars 9, a primary reduction (precrushing) is conducted by crushing as well as a conveying in the working gap or distance 13 between rotor 1 and screen 2.

In particular, the screen 2 is designed u-shaped and/or slanted by 15° to 45°, preferably 30°, in rotor rotation direction 12. Thereby, a particular high effectively operating work area for granulation can be obtained. A particular high efficiency as well as smooth crushing with low fine grain content can be enabled.

In particular, the screen 2 is pivoted about a screen rotation axis 6 on the same or at least approximately same height like the rotor rotation axis 5.

In particular, the distance between the screen rotation axis 6 and the rotor rotation axis 5 is bigger than the sum of half the rotor outer diameter and the target distance between rotor 1 and screen 2.

In particular, the screen 2 has a radial recess on the same or at least approximately same height like the screen rotation axis, which is preferably integrated into a screen support frame 11 of the screen 2. Preferably, the recess has a U-shape being oriented 90° in radial direction, preferably with a v-like beveled side wall.

In particular, a tappet 15 in form of an eccentrically about a tappet rotation axis 7 rotatable shaft runs within the U-shaped recess of the screen 2. Preferably, the tappet is always in direct contact with at least one side wall, preferably with both side walls of the recess of the screen 2.

When the tappet 15 rotates about the tappet rotation axis 7, the screen is swiveled upwards or downwards about the screen rotation axis 6 by the tappet movement 15 and the distance 13 between rotor 1 and screen 2 is increasing or reducing.

The shown device for granulating of coarse material, which may comprise pulverulent solids such as powder, grain, or mixtures thereof, has an automatic distance adjusting unit for adjusting a distance 13 between the rotor 1 and the screen 2, which is configured such that the distance 13 between the rotor 1 and the screen 2 can be reduced until (to) a direct contact and, subsequent to that, the distance 13 can be increased to a predetermined target distance.

In particular, the distance 13 is to be considered as relevant for the aforementioned distance adjustment at such position, at which the rotor 1, with the biggest possible outer diameter 12 of the rotor 1, and the screen 2 meet each other or get into contact at first when the screen 2 swivels in direction of the rotor 1 while the rotor 1 is rotating.

A step engine, which can rotate by a predetermined angle in response to a control signal, serves as drive of the tappet 15, though which the increase and reduction of the distance 13 by means of swiveling of the screen 2 is realized.

A vibration sensor is installed within the housing 4 (in FIG. 1 at the opposite side of the shown wall of the housing 4) at the rotor shaft of rotor 1 and is at that location protected against dirt and damage. The rotor shaft is firmly attached to the rotor 1 by means of a screw connection 14 that is coaxial to the rotor rotation axis 5 such that vibrations of the rotor 1 are transmitted to the rotor shaft with only small loss.

In particular, an analyzing unit for granulate unit size measurement is provided, thus for measuring the extension of a single granulate piece. An analysis value in form of a continuing average value over several measurements can be calculated and output by the analyzing unit.

The distance adjusting unit comprises a central data processing unit, which can process the signals of the vibration sensor and an analysis value of the analyzing unit and which can activate and operate the step motor by means of a control signal.

The data processing unit comprises a user-interface with keyboard and display. By this way, several target distances can be stored and be interrelated with parameters, e.g. raw material to be processed, in a logical manner such that by means of entering one or several parameters the corresponding target distance is automatically selected for a particular effective granulation and is taken as basis during the adjustment of the distance 13.

In practice, the user enters e.g. the actual material to be processed and activates the automatic adjustment. The rotor 1 is then brought in rotation. As next, the data processing unit sends control signals to the step engine until the vibration sensor measures vibration amplitudes that indicate a direct contact between the rotor 1 and the screen 2 on the basis of pre-set threshold values. At the moment of direct contact of the rotor 1 with the screen 2, a rapid increase of the vibration amplitude occurs, which enables a reliable detection without mentionable time delay.

The step motor is then immediately stopped and the rotation direction is reversed in order to increase again the distance 13 between rotor 1 an screen 2. It follows a predetermined number of control signals to the step motor, wherein the predetermined number of control signals corresponds to the underlying target distance. Alternatively, the number of control signals may be converted into a distance value and the step motor is stopped when reaching the target distance. The automatic distance adjustment of the device for granulating is then completed. The granulation of material can then be started.

Also during the orderly production operation, the data processing unit is monitoring the signals of the vibration sensor further on following pre-programmed monitoring algorithms for detecting material clogging or damaged rotor bearings.

In case that an analyzing unit is implemented, the data processing unit will also monitor the analysis value in a similar way during the orderly productions operation in order to eventually optimize the distance 13 between rotor 1 and screen 2 during operation.

According to one aspect of the present disclosure a device for granulating coarse material is provided. Exemplary course materials may comprise pulverulent solids such as powder, grain, or mixtures thereof and which can be created by pressing or compacting by means of press rolling of the pulverulent solid. The device for granulating comprises a rotatable and/or oscillating rotor and a screen and the rotor is composed such that the rotor can convey or press the coarse material through the screen in order to allow obtaining a granulate with a smaller granulate unit size compared to the coarse material. The device for granulating comprises an automatic distance adjusting unit for adjusting a distance between the rotor and the screen. The automatic distance adjusting unit is composed such that the distance between the rotor and the screen is (or can be) reduced until there is a direct contact of the rotor with the screen, and subsequent to that, the distance is increased or can be increased to a predetermined target distance.

Screen usually means an extensive surface area component having a low thickness with screen openings. A perforated (metal) sheet is therefore a screen within the meaning of the present application just like a net formed by wires and may also be realized in this way.

Conveyance of coarse material though the screen means that the coarse material is caused by the rotor to pass though screen openings, which are tighter than the major portion of the coarse material, and thereby gets reduced in size. Usually, such conveying is accomplished by directly pressing of the coarse material by means of the rotor or a part of the rotor against a side of the screen in the area with screen openings, wherein the rotor remains at any time orderly spaced relatively to the screen during processing and hence the pressure force is transferred to the material portions within the screen openings though the coarse material itself that presses against the screen.

Automatic means that the distance adjusting unit for adjusting the distance between the rotor and the screen is not a manually adjusting but an adjusting operated by a machine.

Distance between the rotor and the screen means the distance at a position, at which the rotor and the screen get at first into contact when the rotor and the screen move towards each other.

Reduced until a direct contact means until a direct encounter of one part of the rotor with a part of the screen.

A predetermined target distance is a set distance between the rotor and the screen, thus not an arbitrary or arbitrarily chosen distance.

As a distance between the rotor and the screen can be reduced until a direct contact thanks to the automatic distance adjusting unit and subsequent to that, the distance can be increased to a predetermined target distance, it is enabled that the distance can be adjusted particularly fast and with little effort, because the adjustment is not anymore to be conducted manually that is costly in terms of time. Furthermore, it can thereby be adjusted particularly reproducible and precisely in particular in an area of tenths of a millimeter. Preferably, the target distance amounts to 0.06 to 10 mm, preferably at least 0.1 mm, preferably up to 1 mm.

A always high effectivity of the device for granulating and a reproducible granulate quality can thus be achieved. Because the effectivity and granulate quality are usually influenced by the distance between the rotor and screen. Furthermore, a smaller distance for example may cause damages of the device and a too large distance clotting and undesired material flow though the device.

A smooth granulation with particular low fines, which otherwise would have to be separated and compacted, can thus be achieved. Furthermore, a particular narrow powder or grain size distribution, respectively, for a particular high flowability of the granulate can be enabled.

Moreover, particular high flowability and adhesion capability e.g. during pressing into a pallet can be achieved and the thereby obtained uniformity of the granulate enables a high precision of dosing and homogenous distribution of the active substances. Finally, by this way, also the health hazards for the employees in the production as well as wear of the machines due to fine dust formation can be kept particularly low.

Preferably, the distance adjusting unit has a contact sensor for detecting a direct contact between the rotor and the screen.

By means of a contact sensor for detecting a direct contact between the rotor and the screen, a reliable detection of a zero-distance can be assured and thereby damages of the rotor or the screen due to collision avoided. Zero-contact means that the screen contacts (touches) the rotor.

Preferably, the distance adjusting unit comprises a distance sensor, which allows determining or measuring the change in the distance between rotor and screen. In one embodiment, the increase of the distance to a predetermined target distance is controlled by means of the distance sensor in order to thereby enable adjusting the desired target distance with improved precision. In one embodiment, the reduction of the distance until a direct contact of the rotor with the screen is controlled by means of the distance sensor in order to thereby avoid damages when reaching the zero-distance. In the case of the reduction of the distance, the distance is preferably at first reduced at a higher speed. When falling below a minimum distance, the reduction of the distance is slowed down. This embodiment enables reducing the distance until a direct contact of the rotor with the screen within particular short time without necessity to tolerate increased risk of damage.

The distance sensor can be an optical sensor. Preferably, the distance sensor is an inductive sensor, because this is more resistant to dirt.

Preferably, the distance adjusting unit has a drive for increasing or reducing the distance between rotor and screen, and/or a data processing unit for controlling the drive based on signals of the contact sensor.

Drive means in particular an electric, hydraulic or pneumatic motor commonly with a gearing mechanism, which can transfer a drive force to a shaft, e.g. rotor shaft, based on a control signal.

Controlling the drive means increasing or reducing the distance between rotor and screen in a predetermined manner, thus e.g. stopping the drive at a distance of zero (zero-distance) as well as stopping the drive when reaching the target distance.

An automatic reduction of the distance to zero can thereby be achieved in a particular simple manner.

Preferably, the data processing unit is configured such that, during controlling a drive for increasing the distance between the rotor and the screen, an actual distance value is calculated based on a control signal for (to) the drive and can be used for controlling the drive. In particular, the number of control signals or the duration and strength of the control signal can be taken as basis for said calculation.

An automatic increase of the distance to the target distance can thereby be realized in a particularly simple and reliably manner.

In particular, the distance adjusting unit provides an input unit, e.g. keyboard, and/or output unit, e.g. display, in order to allow adjusting a target distance.

Preferably, several target distances as basis for controlling a drive can be stored in a data processing unit of the distance adjusting unit or there are stored several target distances, and/or the data processing unit is configured such that at least one parameter can be entered by the user into the data processing unit and the data processing unit independently selects a specific target distance depending on the at least one entered parameter and takes it as basis for controlling the drive.

A parameter can be e.g. the coarse material to be processed, the used screen type and/or the screen opening width and/or the rotational speed of the rotor.

In particular, an algorithm, a calibration curve or logic selection criteria can be stored in the data processing unit for the independent selection of a target distance depending on the at least one entered parameter.

Thanks to the automatic or independent selection of a target distance among several stored target distances or target distance values by the data processing unit though entering one or several parameters, a continuous equal adjustment and constant way of production at same products but different points in time of production is enabled. Target distances can be selected particularly user-friendly, easily and with little effort for the user based on the parameter that is to be entered and commonly known by the user, e.g. the material to be processed and/or the actual used screen. The user may thereby avoid a selection of the target value by means on tables and algorithms etc. based on the at least one parameter.

In one embodiment, the device independently determines one or several parameters like for example the type of the used screen.

Preferably, the contact sensor is a vibration sensor for measuring vibration amplitudes, and/or the device for granulating is composed such that the rotor, particularly automatically, can be brought or is brought in rotation and/or oscillation for adjusting the distance between the rotor and the screen by means of the distance adjusting unit or continues a rotation and/or oscillation during the time of adjustment.

Vibration means a high-frequency, alternating movement or vibration of an element. A vibration amplitude describes the displacement in length units of a vibrating element related to the normal position.

By means of the use of a vibration sensor as contact sensor, several advantages can be achieved.

Firstly, it can be accomplished the preconditions for arranging the contact sensor or vibration sensor out of those areas that get into contact with the material to be processed. A contamination, damage or impairment of the sensor can thus be avoided and a particular high reliability and long lifetime can be achieved.

Secondly, a vibration sensor allows not only to be used for zero-distance detection of rotor and screen, but also at the same time as bonus effect for monitoring the production process or granulation process. By means of such monitoring, clogging of the screen, undesired foreign objects in the material to be processed as well as wear of the rotor bearing or rotor-screen-collision can be detected.

In particular, for the purpose of such monitoring, running along upper and/or lower tolerance thresholds of the vibration amplitude or vibration characteristics with respect to e.g. the determinable frequencies or frequency spectra can be used. In particular, a rotational speed and/or oscillating speed can be adjustable during the time period of adjustment.

Thanks to the device for granulating that is configured such that an adjustment of the distance between the rotor and the screen is carried out by the distance adjusting unit when the rotor is rotating and/or oscillating, it can be assured in a particularly simple manner that a particular strong and consistent vibration sensor signal can be obtained.

In particular, the device for granulating is configured such that no material is supplied to the rotor during adjusting the distance between the rotor and the screen by means of the distance adjusting unit.

A particularly precise adjustment of the target distance can thereby be achieved.

Preferably, the vibration sensor is arranged on or attached to a rotor shaft of the rotor, preferably directly on the rotor shaft, and/or in an area of the device for granulating that is not getting in contact with the coarse material or granulate.

Thanks to the vibration sensor being arranged at the rotor shaft of the rotor and/or in an area of the device for granulating that is not getting in contact with the coarse material or granulate, thus for example not at the screen or at the rotor or at the rotor shaft beyond a sealing for the device housing, contamination, damage or impairment of the sensor can be avoided and a particular high reliability and long lifetime be achieved. Furthermore, a particularly reliable monitoring of the production process is possible.

Preferably, the distance adjusting unit is configured such that reducing or increasing the distance between the rotor and the screen is accomplished by a movement or a swiveling of the screen.

Movement means a relative movement relative to the rotor. A swiveling is usually a rotation about a particularly eccentric axis.

Thanks to the realization of the distance by movement or swiveling of the screen and not for example by movements of the rotor and rotor shaft, a still particularly reliable sealing of the rotor shaft against the ingress of processing material into the device housing can be achieved in a particular simple manner.

Furthermore, devices for granulating can thereby be upgraded with very little expenditures.

Alternatively or additionally, a reduction or increase of the distance between the rotor and the screen can however also be accomplished by means of a movement of the rotor, although this embodiment is less preferred.

Preferably, a drive of the distance adjusting unit comprises a step motor and/or a gearing mechanism with tappet (eccentric member).

A step motor is an electric motor that, by a defined control signal, conducts a rotation by an exact predetermined angular range, e.g. ¼ revolution. The number of control signals can thus be correlated particularly easy with the number of revolutions. A step motor can be a synchronous motor. A gearing mechanism with tappet can be realized by a driving shaft having an oval cross section or eccentric bearing. A particularly simply transformation of a drive rotary movement of the motor into a translational movement or a swiveling of the screen can thus be enabled.

By the use of a step motor, the actual distance value can be determined particularly simple and reliable when controlling the drive for increasing the distance between the rotor and the screen based on the duration and/or the strength of the control signal that goes to the drive.

A step motor furthermore allows a particularly slow and precise drive motion, e.g. moving the screen. Damage of the rotor and the screen can thereby counteracted when moving to the zero-distance.

Preferably, the device for granulating comprises an analyzing unit for analyzing the produced granulate, e.g. granulate unit size, and creating at least one analysis value, e.g. granulate size, and/or the data processing unit is configured such that at least one analysis value can be taken as basis for controlling the drive particularly by the data processing unit.

By means of an analyzing unit for analyzing the produced granulate and creating at least one analysis value, the prerequisites for a readjusting of the distance between rotor and screen are provided.

By means of a data processing unit that is configured such that at least one analysis value, e.g. granulate size, can be taken as basis for controlling the drive, a readjustment can be realized in the running production process in order to continuously achieve a high effectively and product quality.

In a further aspect of the present disclosure, a device for compacting and granulating with one or several of the above described features of the main claim and the subclaims is provided.

Basically, the rotor rotates during operation and optionally can additionally oscillate. But an oscillation may also suffice for granulating.

The features mentioned in the present application and embodiments as well as the in claims are alone as well as also in arbitrary manner usable in combination with each other. The disclosure of the invention is therefore not limited to the described or claimed combination of features. Rather, all feature combinations are to be considered as disclosed.

The invention claimed is:

1. A device for granulating coarse material, the device comprising
   a rotor (1) configured to rotate or oscillate, and
   a screen (2),
   wherein the rotor (1) is configured to press the coarse material through the screen (2) in order to produce a granulate with a smaller granulate unit size compared to the coarse material,
   wherein the device further comprises an automatic distance adjusting unit configured to adjust a distance (13) between the rotor (1) and the screen (2), the automatic distance adjusting unit being configured such that the distance (13) between the rotor (1) and the screen (2) is reduced until a direct contact of the rotor (1) with the screen (2) is achieved, and subsequent to that, the distance (13) is increased to a predetermined target distance, wherein the distance adjusting unit has a contact sensor for detecting a direct contact between the rotor (1) and the screen (2), wherein the contact sensor is a vibration sensor for measuring vibration amplitudes of the device, and wherein the vibration sensor is arranged on a rotor shaft of the rotor (1).

2. The device of claim 1, wherein the distance adjusting unit has a drive for increasing or reducing the distance (13) between the rotor (1) and the screen (2).

3. The device of claim 2, wherein the distance adjusting unit has a data processing unit configured to control the drive based on signals of a contact sensor.

4. The device of claim 1, wherein a data processing unit is configured such that, during control of a drive for increasing the distance (13) between the rotor (1) and the screen (2), an actual distance value is calculated based on a control signal for the drive.

5. The device of claim 1, wherein several target distances as basis for controlling a drive can be stored in a data processing unit of the distance adjusting unit.

6. The device of claim 5, wherein the data processing unit is configured such that at least one parameter can be entered by the user into the data processing unit and the data processing unit independently selects a specific target distance depending on the at least one entered parameter and takes it as basis for controlling the drive.

7. The device of claim 1, wherein the distance adjusting unit is configured such that reducing or increasing the distance (13) between the rotor (1) and the screen (2) is accomplished by a movement of the screen.

8. The device of claim 1, further comprising an analyzing unit configured to analyze the produced granulate and to create at least one analysis value.

9. The device of claim 1, further comprising a data processing unit that is configured such that at least one analysis value can be taken as basis for controlling a drive.

10. The device of claim 1, wherein the device is configured such that the rotor (1) is mounted for movement relative to the screen to adjust the distance (13) between the rotor (1) and the screen (2).

11. The device of claim 1, wherein the vibration sensor is arranged in an area of the device that is not getting in contact with the coarse material or granulate during operation of the device.

* * * * *